United States Patent
Palmer et al.

(10) Patent No.: US 11,754,736 B2
(45) Date of Patent: Sep. 12, 2023

(54) SYSTEM AND METHOD FOR CLASSIFYING SEISMIC DATA BY INTEGRATING PETROPHYSICAL DATA

(71) Applicant: Chevron U.S.A. Inc., San Ramon, CA (US)

(72) Inventors: Justin Curtis Palmer, Houston, TX (US); Lisa Renee Goggin, Sugar Land, TX (US); Adam Dean Halpert, Houston, TX (US); Laura Leigh Bandura, Houston, TX (US); Christopher H. Skelt, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 202 days.

(21) Appl. No.: 17/232,711

(22) Filed: Apr. 16, 2021

(65) Prior Publication Data

US 2021/0255347 A1    Aug. 19, 2021

Related U.S. Application Data

(63) Continuation-in-part of application No. 16/144,820, filed on Sep. 27, 2018, now Pat. No. 10,948,618, which is a continuation-in-part of application No. 15/730,814, filed on Oct. 12, 2017, now Pat. No. 10,725,189.

(60) Provisional application No. 63/011,656, filed on Apr. 17, 2020.

(51) Int. Cl.
| | | |
|---|---|---|
| G01V 1/30 | (2006.01) | |
| G01V 1/28 | (2006.01) | |
| G01V 1/34 | (2006.01) | |
| G06N 5/01 | (2023.01) | |

(52) U.S. Cl.
CPC .............. *G01V 1/306* (2013.01); *G01V 1/282* (2013.01); *G01V 1/345* (2013.01); *G06N 5/01* (2023.01); *G01V 2210/6161* (2013.01); *G01V 2210/64* (2013.01); *G01V 2210/665* (2013.01)

(58) Field of Classification Search
CPC ........ G01V 1/306; G01V 1/282; G01V 1/345; G01V 2210/6161; G01V 2210/64; G01V 2210/665; G01V 2210/667; G01V 1/301; G01V 99/005; G06N 5/003; G06N 20/20

See application file for complete search history.

(56) References Cited

U.S. PATENT DOCUMENTS

| | | | |
|---|---|---|---|
| 2020/0096660 A1* | 3/2020 | Eckersley | G01V 1/28 |
| 2020/0160173 A1* | 5/2020 | Pandey | G01V 99/005 |
| 2021/0110280 A1* | 4/2021 | Akkurt | G01V 5/12 |

* cited by examiner

*Primary Examiner* — Mohammad K Islam
(74) *Attorney, Agent, or Firm* — Marie L. Clapp

(57) ABSTRACT

A computer-implemented method is described for seismic facies identification including receiving a seismic dataset representative of a subsurface volume of interest; applying a model conditioned by petrophysical classifications to the seismic dataset to identify seismic facies and generate a classified seismic image; and identifying geologic features based on the classified seismic image. The method generates seismic facies probability volumes.

15 Claims, 14 Drawing Sheets

SYSTEM AND METHOD FOR CLASSIFYING SEISMIC DATA BY INTEGRATING PETROPHYSICAL DATA

CROSS-REFERENCE TO RELATED APPLICATIONS

This application claims the benefit of U.S. Provisional Patent Application 63/011,656 filed Apr. 17, 2020 and is a continuation-in-part of U.S. Pat. No. 10,725,189 granted Jul. 28, 2020 and a continuation-in-part of U.S. Pat. No. 10,948,618 granted Mar. 16, 2021.

STATEMENT REGARDING FEDERALLY SPONSORED RESEARCH OR DEVELOPMENT

Not applicable.

TECHNICAL FIELD

The disclosed embodiments relate generally to techniques for classifying facies in subsurface reservoirs and, in particular, to a method of identifying facies from seismic data via machine learning by integrating petrophysical data classification.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. The seismic image can be used to obtain seismic facies. Seismic facies are groups of reflections in the seismic image that can be categorized based on characteristics such as amplitude (e.g., amplitude variation with offset/angle), continuity, geometry, and/or texture. Knowledgeable practitioners can interpret these facies as corresponding to subsurface properties such as lithology, depositional environment, and fluid content. This information may be used in a hydrocarbon exploration setting to search for ideal geological settings for hydrocarbon reservoirs, and for model-building purposes to assign appropriate properties (velocity, density, permeability, porosity, etc.) within the individual facies.

Prior art includes approaches based on classifying data on a trace-by-trace basis using, for example, neural nets or self-organizing maps. This can be detrimental to accurately representing the true geometry or connectivity of geological features. Moreover, these trace-by-trace methods are time consuming and create bottlenecks in the process of characterizing the subsurface.

In addition to seismic data, in some areas, wells have been drilled and petrophysical data (i.e., wireline log data) has been obtained. For example, this well log data may include gamma ray logs, nuclear magnetic resonance (NMR) data, resistivity data, and the like. Analysis of these well logs can allow identification of facies such as sand (i.e., sandstone) and shale. However, these facies are considered to be only accurate for the region immediately surrounding the well bore.

Current methods (e.g. seismic inversion) to extrapolate well data (e.g. rock types, pore pressure) between wells requires a significant investment in time and computation power and are not easily iterated. Adjusting input parameters and observing the results can take weeks to months, a timeline that is not feasible for many business-critical decisions. We needed the ability to rapidly extrapolate known subsurface data (existing in various formats and resolutions and collected by different means) collected in wells to areas without well control. The method needs to be capable of assessing the accuracy of the predictions away from wells to ensure that business-critical decisions include an appropriate awareness of uncertainty.

The ability to identify facies in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for determining 3-D distributions of seismic facies from seismic images more efficiently and accurately that will allow better seismic interpretation of potential hydrocarbon reservoirs.

SUMMARY

In accordance with some embodiments, a computer-implemented method is disclosed to predict heterogeneous shale properties and distribution from seismic data by obtaining a seismic dataset representative of a subsurface volume of interest; applying a model conditioned by petrophysical classifications to the seismic dataset to identify seismic facies and generate a classified seismic image; and identifying geologic features based on the classified seismic image. In an embodiment, the model conditioned by petrophysical classifications may obtain regional petrophysical trends; obtain local petrophysical data; compare the local petrophysical data to the regional petrophysical trends to identify local deviations; generate local petrophysical classifications using the local deviations to classify shale facies; extract a seismic volume around the local petrophysical data; and generate seismic facies probability volumes using supervised machine learning.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
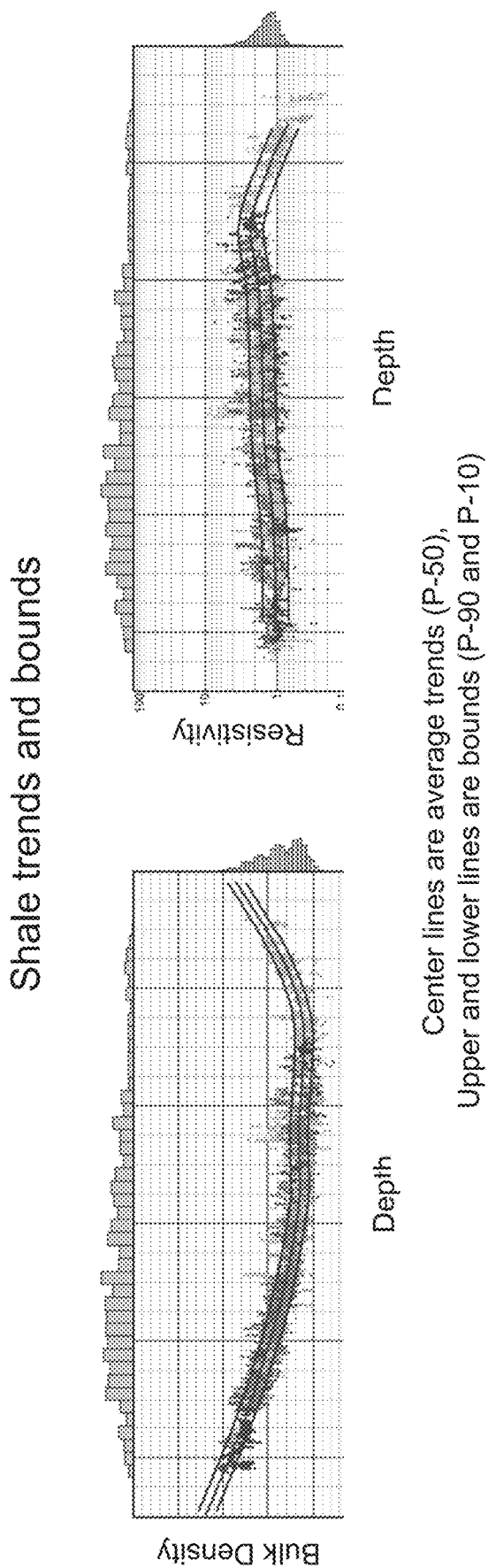
FIG. 1 illustrates a step of a method for seismic facies identification, in accordance with some embodiments.

Described below are methods, systems, and computer readable storage media that provide a manner of seismic facies identification via machine learning. These embodiments are designed to be of particular use for seismic facies identification of subsurface volumes in containing fine-grained rock formations such as shale. These approaches use geometric and/or textural characteristics associated with seismic facies and identifies them using established or novel machine learning techniques. Machine learning techniques may be able to take advantage of significant computational processing power to uncover patterns in data that would be difficult for human interpreters to spot, leading to more accurate facies classifications.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system that utilize machine learning and proprietary interpretive technologies to improve the accuracy of fine-grained rock facies classifications in 3D seismic data away from well control. The rock properties of shale impact the entire petroleum system including hydrocarbon migration pathways, seal quality and presence, structural style, waste rock volume, and pore pressure. Shale properties are diverse and can be characterized with petrophysical techniques. Changes in shale hardness as identified in logs results in a unique seismic texture that may be used to predict the distribution of shale facies. The present invention is a method to classify, capture and visualize log-defined fine-grained rock properties distributions within 3D seismic to better understand the impact these facies have on the entire petroleum system. In basins with high quality 3D seismic data as well as regional-trend referenced petrophysical classifications of diverse fine-grained rock types, the petrophysical classifications can be used to seismically map fine-grained rock property trends. The method couples two techniques for petrophysical rock typing with image classification using machine learning. In an embodiment, it generates probability cubes for the various facies that may occur in a given subsurface volume.

The method couples multiple machine learning technologies (U.S. Pat. No. 10,725,189, US Patent 10,948,61) with a variant on a log analysis to analyze lithologic classifications as defined from wireline log data. Generated products include 3D volumetric probability cubes that can be used to spatially identify and predict targeted rock-properties in 3D seismic. Results can be validated through blind well tests and by tying results to known data from core, cuttings, and lab-based rock property measurements.

In an embodiment, the method first generates a machine-learning model that is conditioned using petrophysical data. In particular, the petrophysical data is analyzed to differentiate between various types of shale and sand. To do so, the method obtains regional petrophysical trends. FIG. 1 illustrates petrophysical logs from 6 wells with accompanying analysis to identify regional shale trends. The trends capture average properties. It is also possible to define upper and lower bounds (e.g., P-10 and P-90 curves). Although this figure demonstrates how the regional trends can be determined, the regional trends may also be obtained from any regional study already completed. This figure only shows the regional trend analysis for bulk density (RhoB) and resistivity but trends can be found for any well logs, such as but not limited to neutron, gamma ray, and velocity (P and S). Additionally, the upper and lower bounds need not be the P-10 and P-90 curves; those of skill in the art will be able to identify geologically meaningful bounds.

Figure 2:
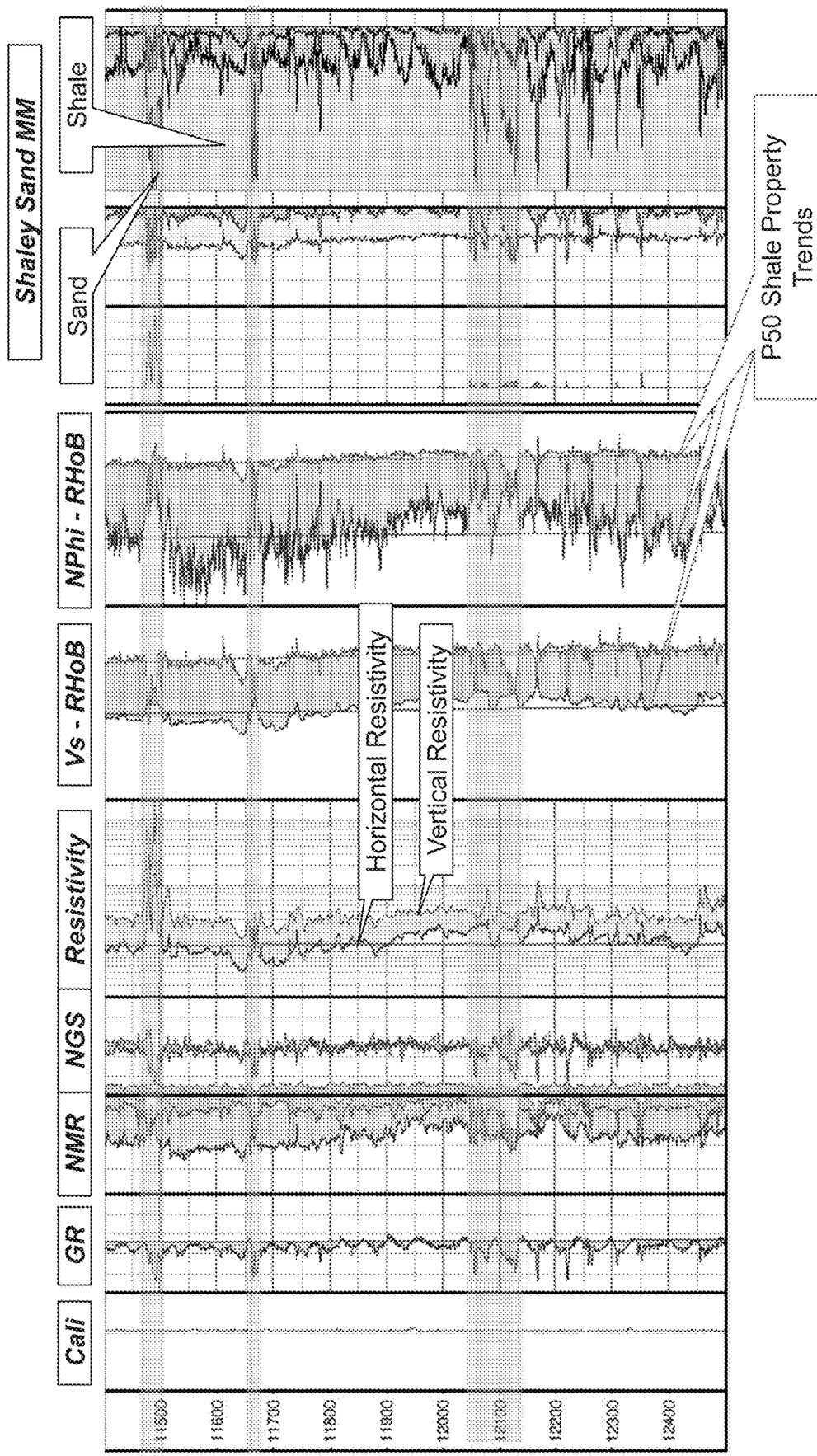
FIG. 2 illustrates a step of a method for seismic facies identification, in accordance with some embodiments.
Figure 3:
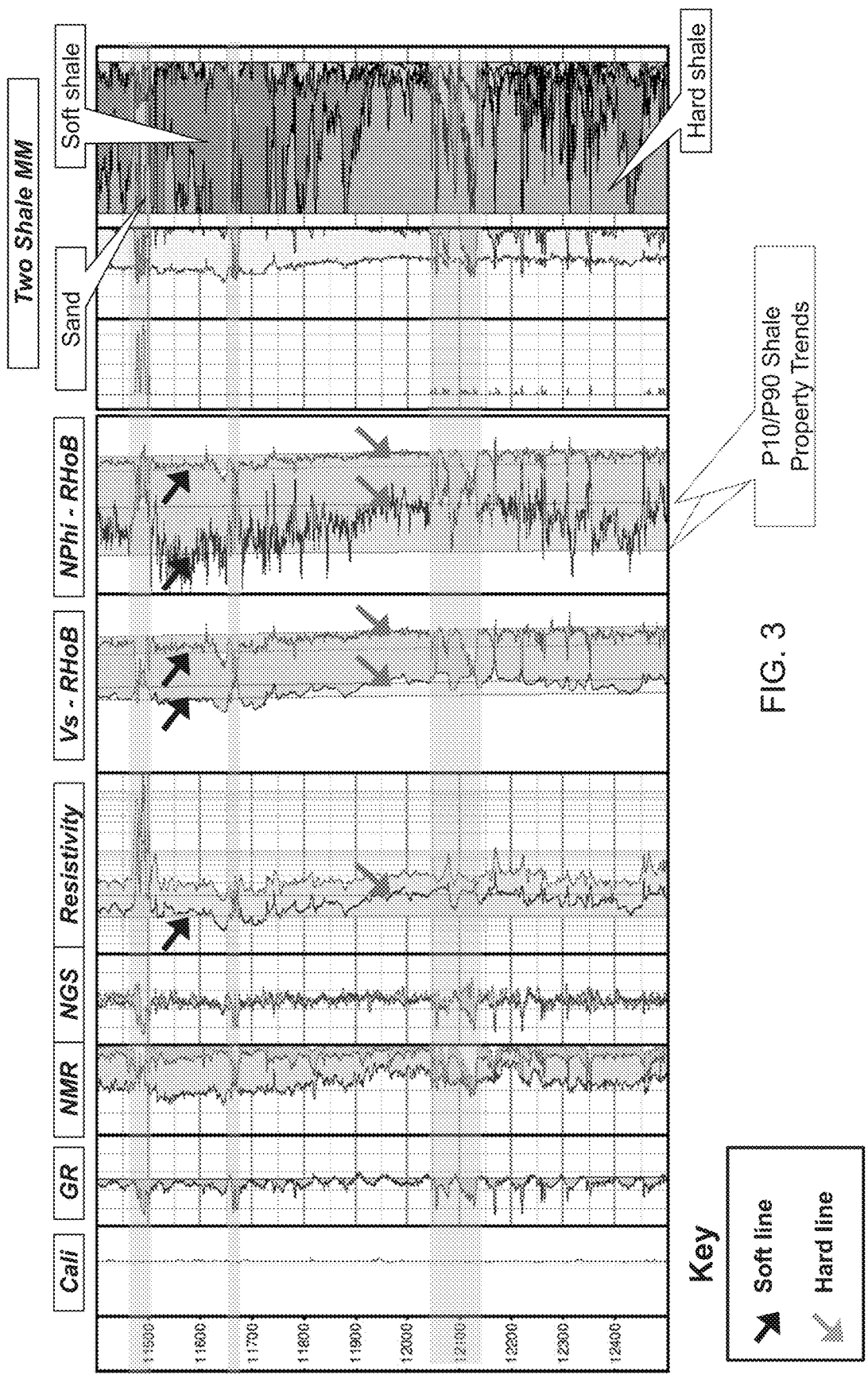
FIG. 3 illustrates a step of a method for seismic facies identification, in accordance with some embodiments.
Figure 4:
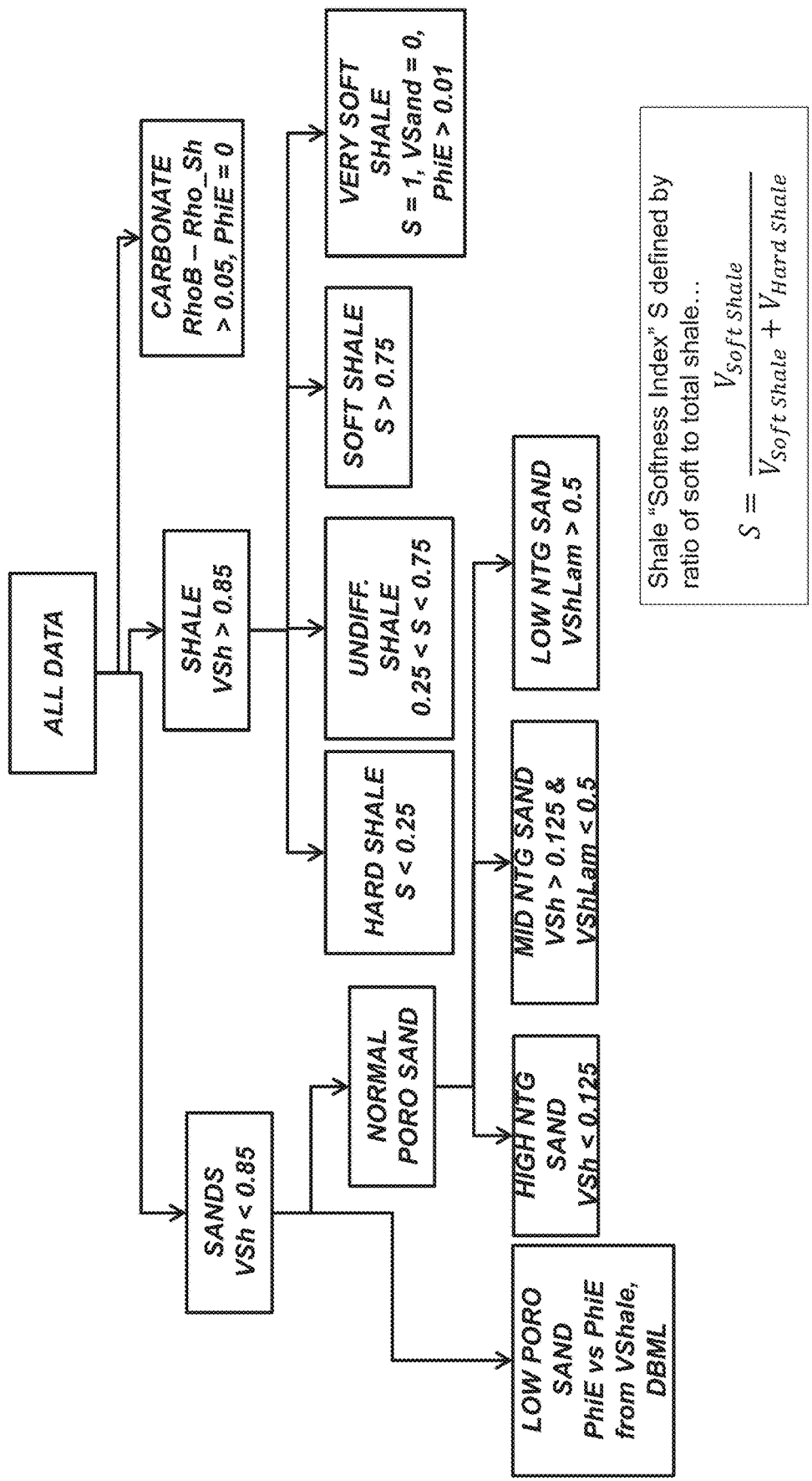
FIG. 4 illustrates a possible decision tree for facies classification.
Figure 5:
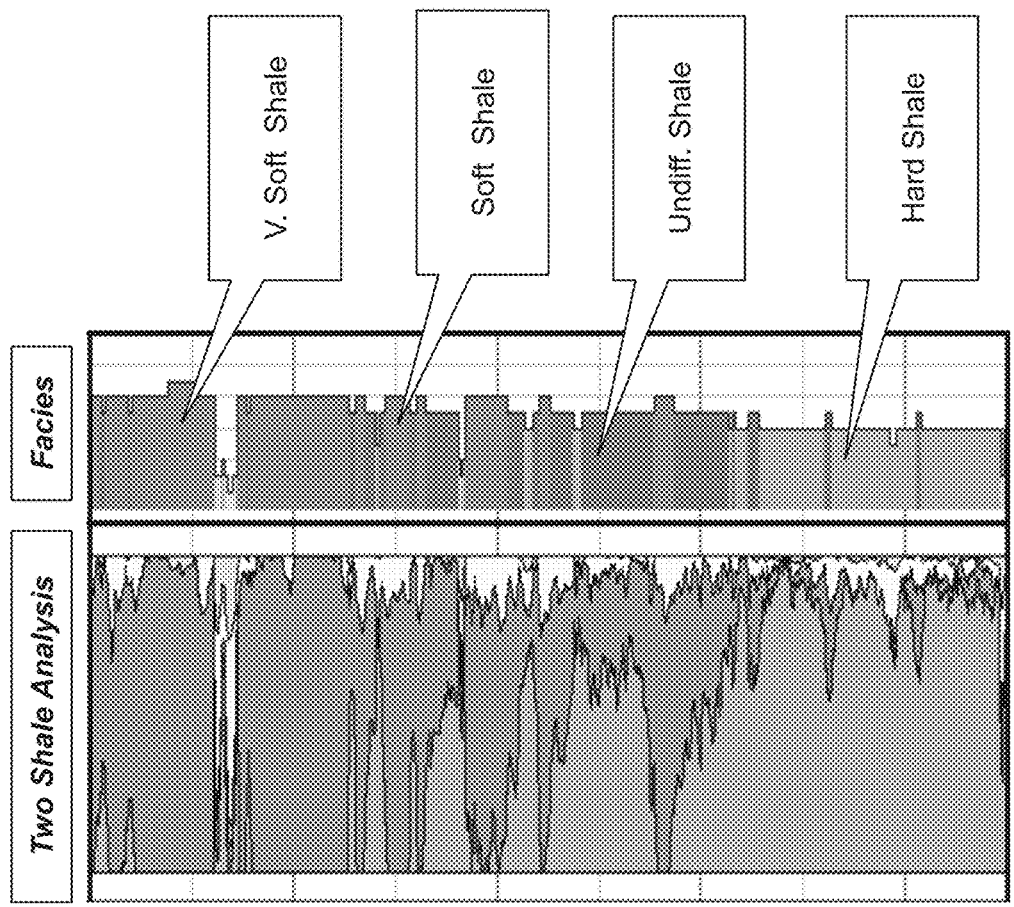
FIG. 5 illustrates an example of shale facies classification.

As seen in FIG. 2, well logs from a single well can be compared to the shale property trends obtained for the region. Since this is a single, local location, the logs diverge significantly on either side due to shale property diversity. However, this variation can also use the bounds found in the regional trends to help identify correlations between the different types of logs. For example, for the logs seen in FIG. 2, the logs usually remain within the bounds in shale. This allows identification of sand versus shale. In this example, the multi-mineral (MultiMin) analysis helps to identify and delineate the sections that are primarily sand versus those that are primarily shale. This initial identification can be further broken down using a "two shale" analysis as shown in FIG. 3, where the P-10 and P-90 curves are used as inputs to the model. This allows us to identify soft shale, hard shale, and sand. However, even finer facies classification can be done. For example, as shown in FIG. 4, the logs can be used to break down the facies in many additional categories. However, this example is not meant to be limiting; those of skill in the art will recognize that the thresholds defined here are dependent on local conditions. FIG. 5 illustrates an example of the shale facies classification based on the two shale analysis.

Figure 6:
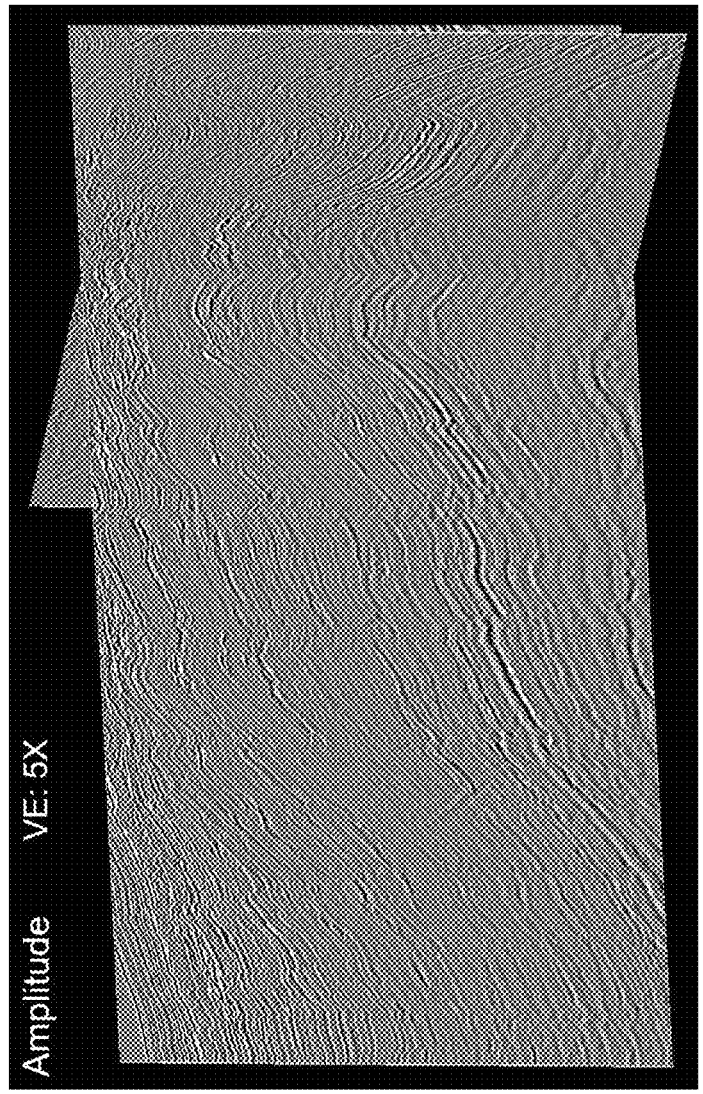
FIG. 6 illustrates a step of a method for seismic facies identification, in accordance with some embodiments.
Figure 7:
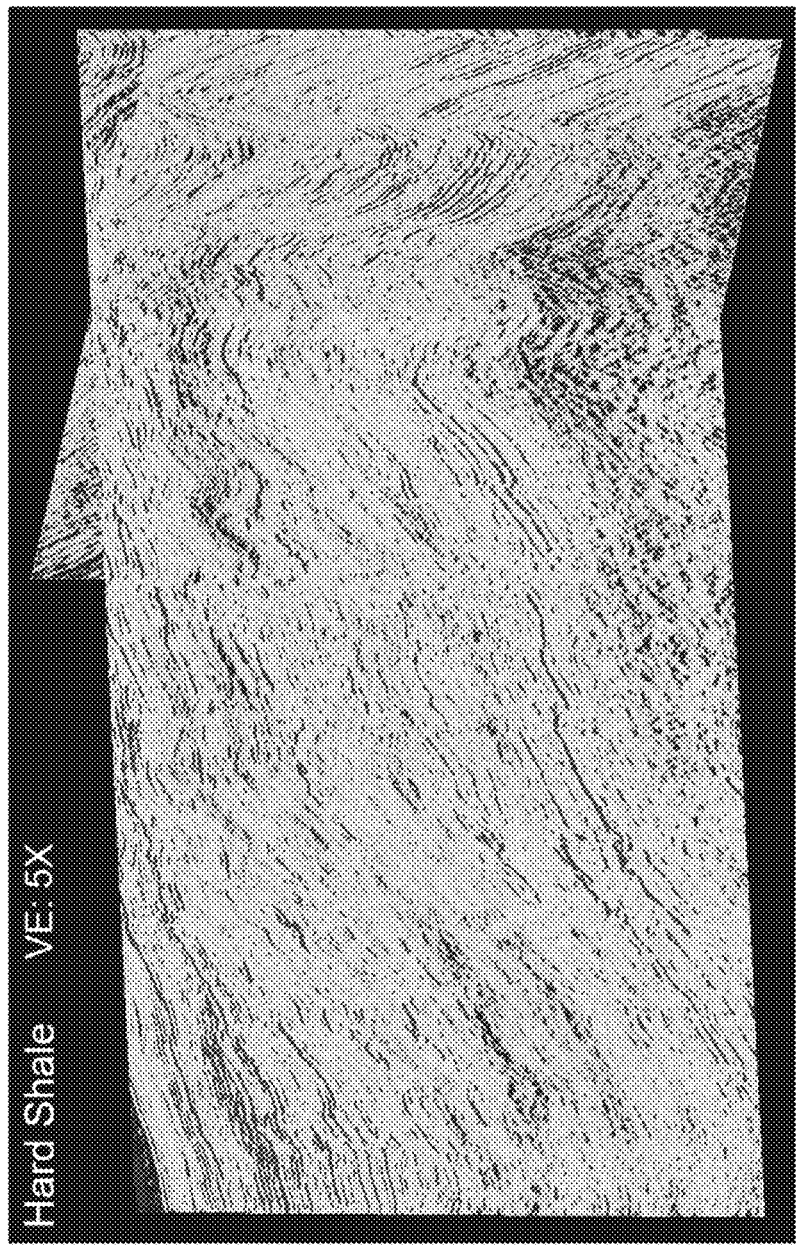
FIG. 7 demonstrates a result of a method for seismic facies identification, in accordance with some embodiments.
Figure 8:
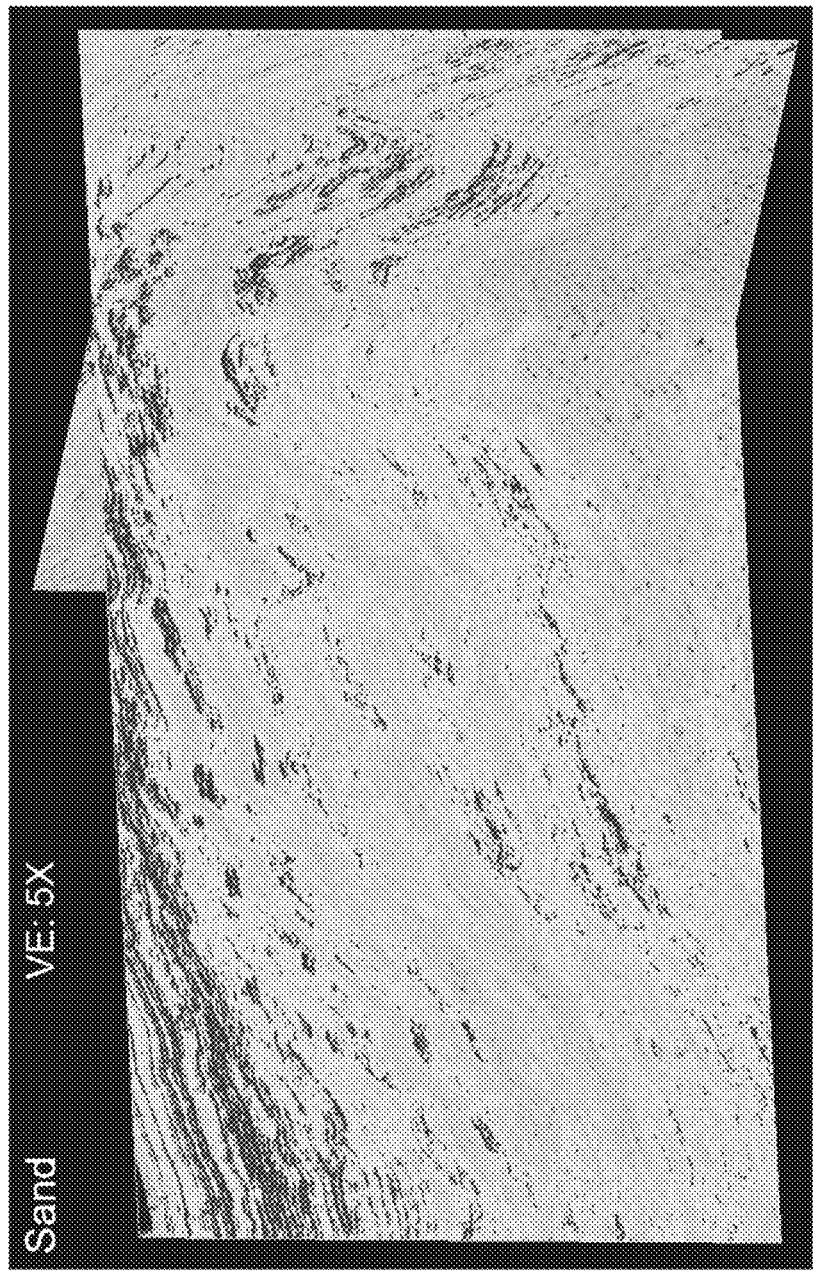
FIG. 8 demonstrates a result of a method for seismic facies identification, in accordance with some embodiments.
Figure 9:
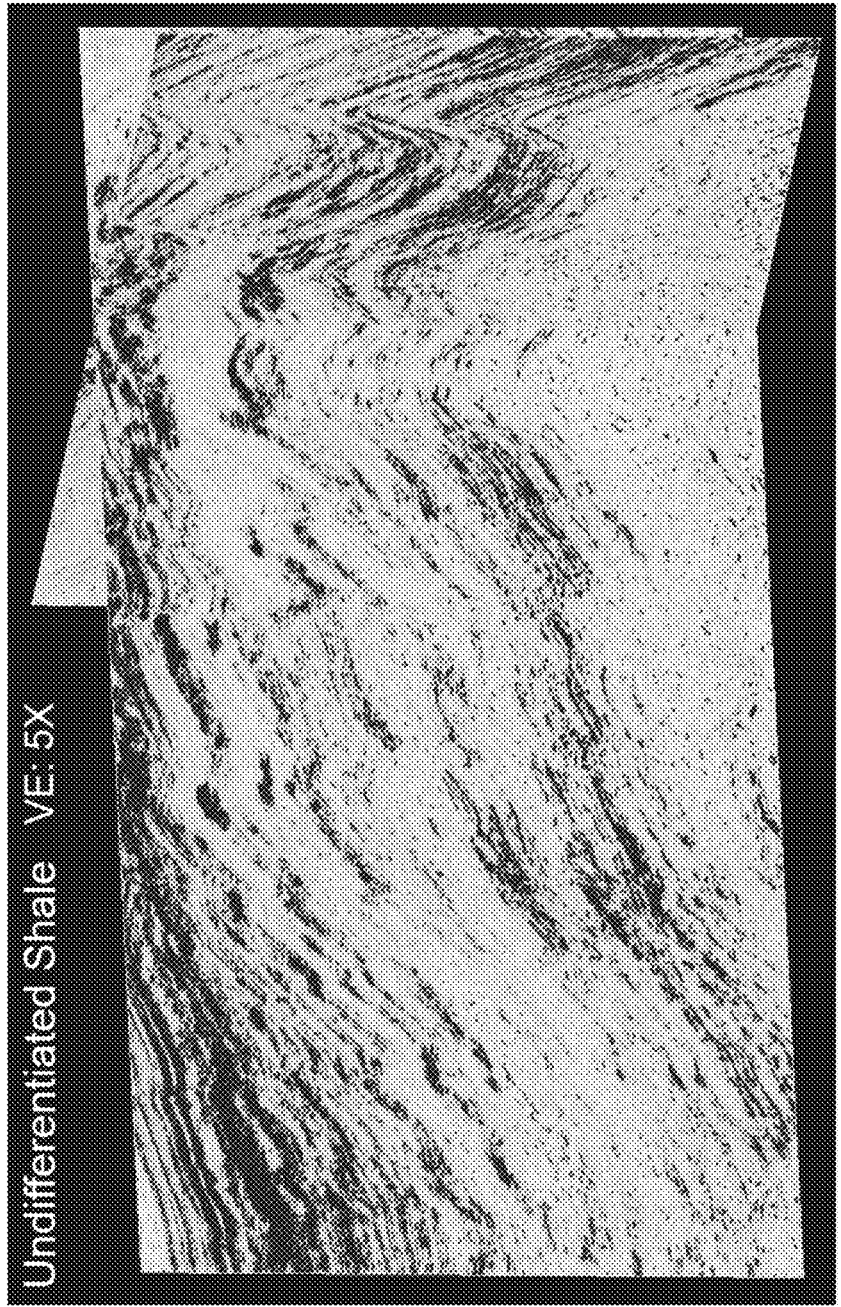
FIG. 9 demonstrates a result of a method for seismic facies identification, in accordance with some embodiments.
Figure 10:
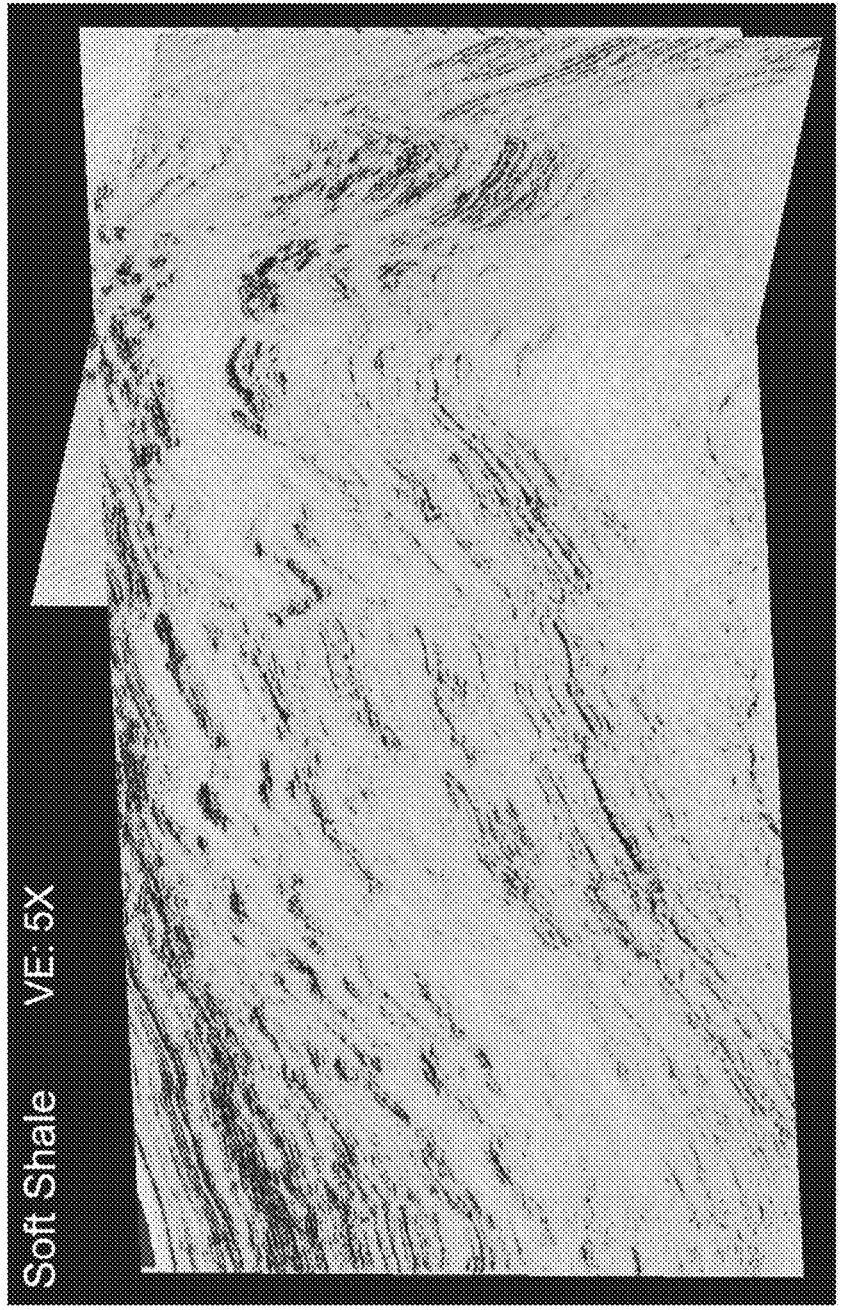
FIG. 10 demonstrates a result of a method for seismic facies identification, in accordance with some embodiments.
Figure 11:
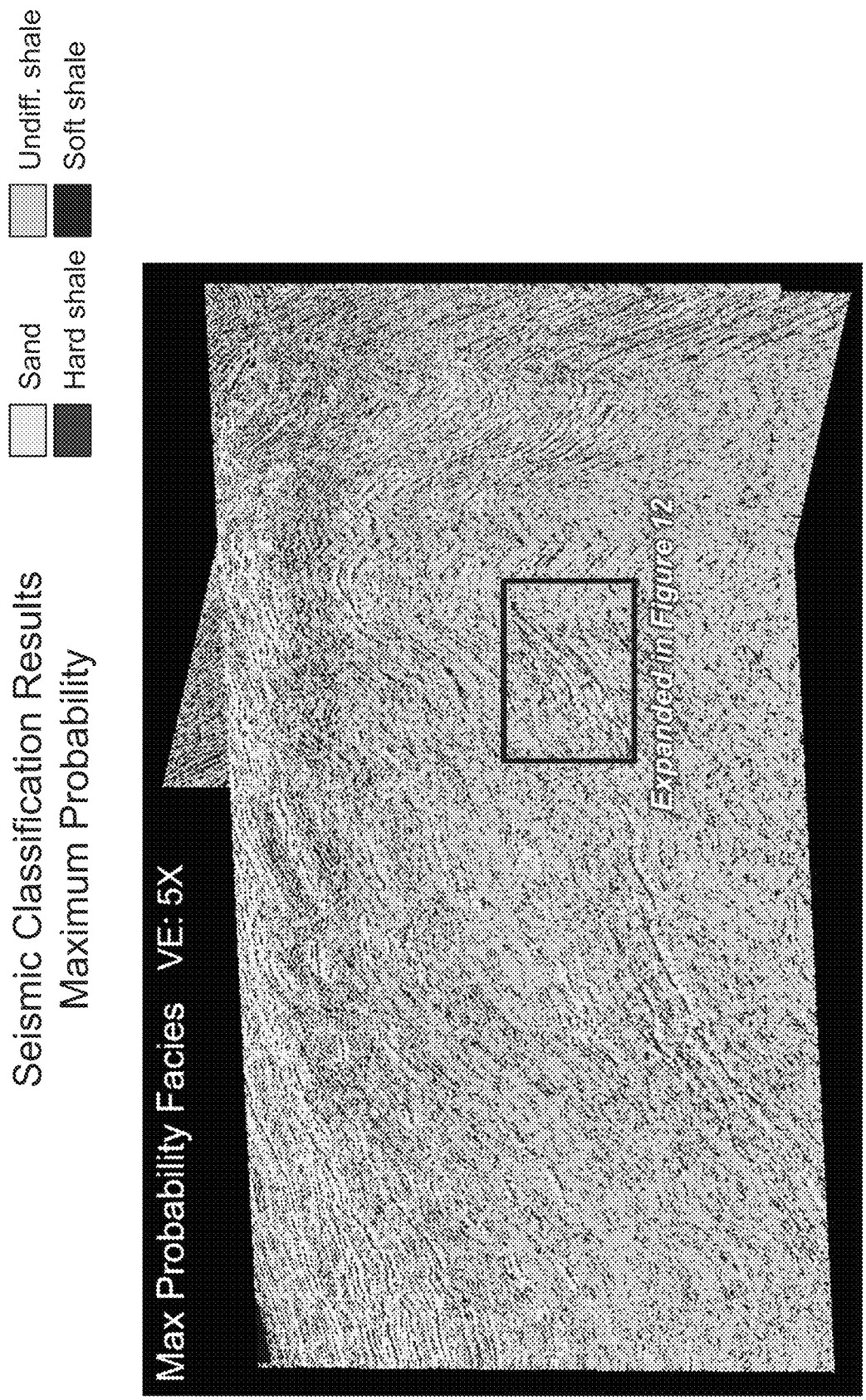
FIG. 11 demonstrates a result of a method for seismic facies identification, in accordance with some embodiments.
Figure 12:
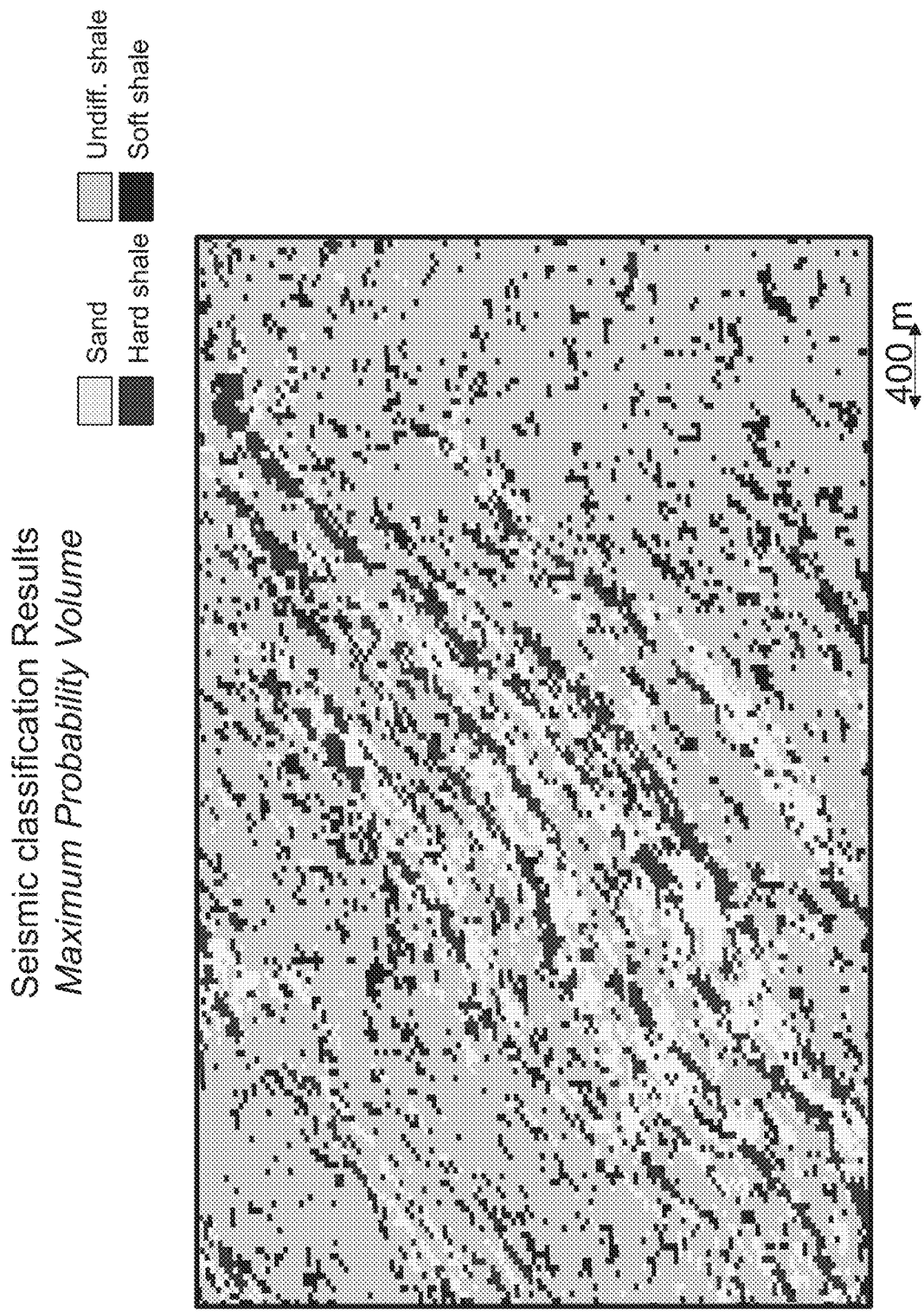
FIG. 12 demonstrates a result of a method for seismic facies identification, in accordance with some embodiments.
Figure 13:
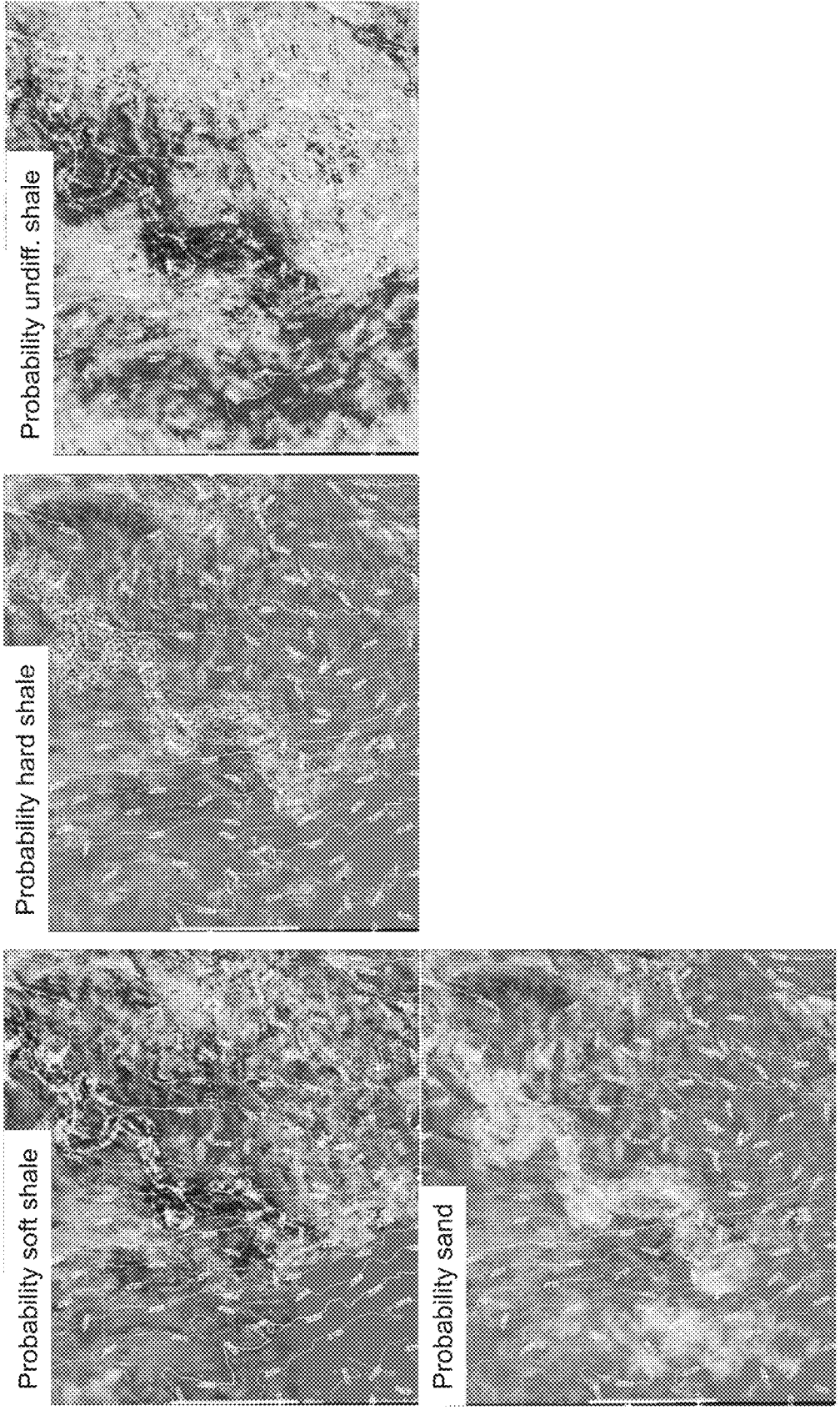
FIG. 13 demonstrates a result of a method for seismic facies identification, in accordance with some embodiments.

FIG. 6 illustrates a seismic volume representative of a subsurface volume of interest surrounding the wells used to identify the four classes shown to the left. In order to be able to do so, in an embodiment, the seismic data can be classified using a random forest-based image classifier trained on the facies identified at the well via supervised learning. The process involves first converting the seismic data into a series of stacked images. Multiple image processing methods (edge detectors, texture filters, membrane detectors, and noise reduction filters) are applied to each image, creating a multitude of images for each original image. The image classifier is trained on the stack of images, with ground truth data provided where a wellbore with the facies classifications intersects the image. After the image classifier is trained at all wellbore locations within the image stack, the classifier is then applied to the entire seismic volume. The output of this step is a new seismic volume for each facies originally provided as training data (FIGS. 7-12). These are probability cubes of each of the lithologies based on the seismic facies. We also calculate the highest probability facies for each voxel in a volume, yielding a 'Max Probability Facies' volume (FIGS. 11 & 12). In an embodiment, the methods shown in U.S. Pat. No. 10,725,189 and US Patent 10,948,61 may be used. FIG. 13 shows the probability information for each of the seismic facies co-rendered with the seismic data. By overlaying the probability information on the seismic data, it is possible to make interpretations based on the apparent structural correspondence. For example, in FIG. 13, the shapes of the various facies correspond to a channel structure.

Figure 14:
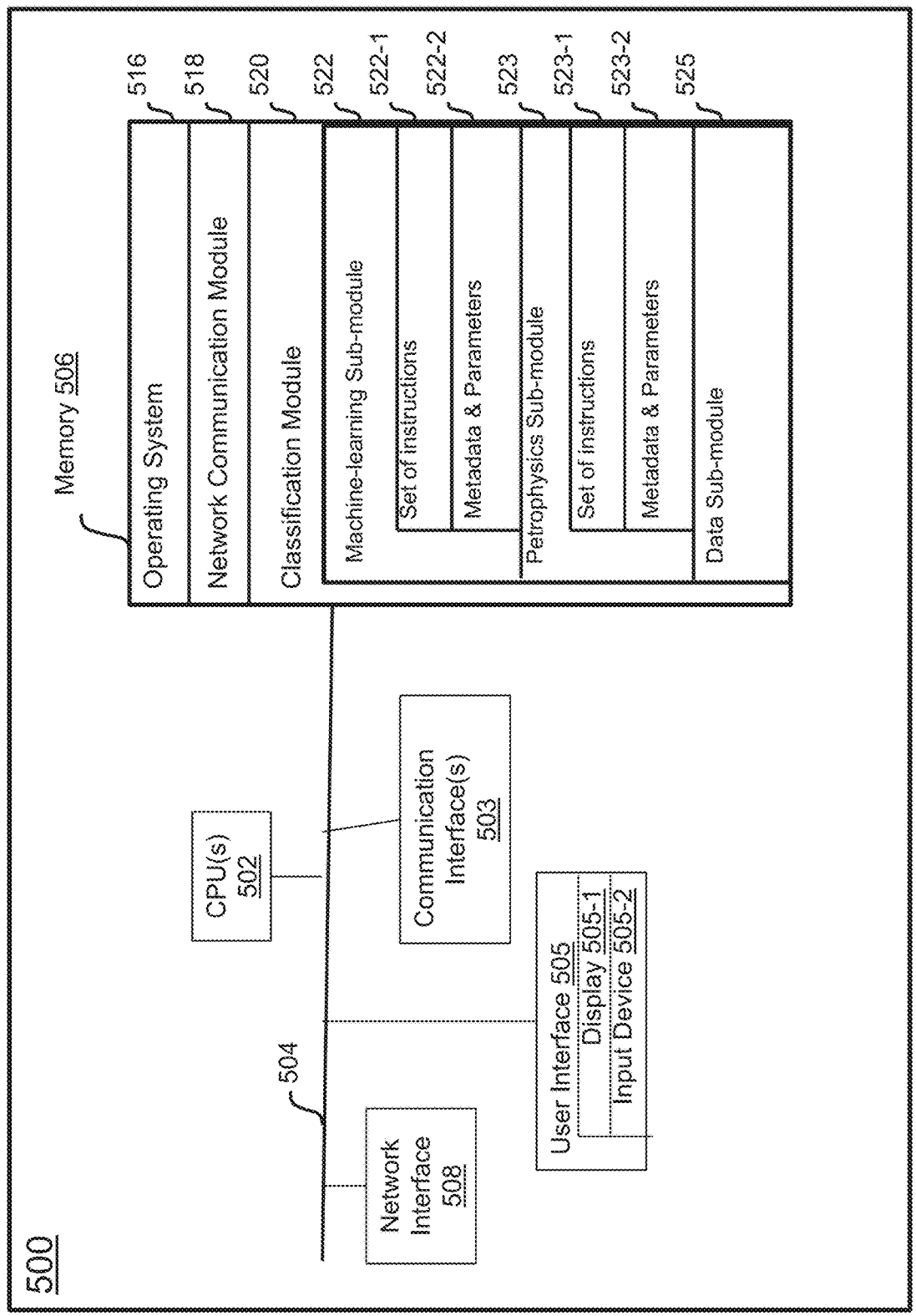
FIG. 14 is a block diagram illustrating a seismic facies identification system, in accordance with some embodiments.

FIG. 14 is a block diagram illustrating a seismic facies identification system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic facies identification system 500 includes one or more processing units (CPUs) 502, one or more network interfaces 508 and/or other communications interfaces 503, memory 506, and one or more communication buses 504 for interconnecting these and various other components. The seismic facies identification system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a classification module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the classification module 520 executes the operations of the method. Classification module 520 may include data sub-module 525, which handles the seismic dataset and petrophysical data. This data is supplied by data sub-module 525 to other sub-modules.

Machine learning sub-module 522 contains a set of instructions 522-1 and accepts metadata and parameters 522-2 that will enable it to execute operations of the method. The petrophysics sub-module 523 contains a set of instructions 523-1 and accepts metadata and parameters 523-2 that will enable it to contribute to other operations of the method. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic facies image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

The method is, optionally, governed by instructions that are stored in computer memory or a non-transitory computer readable storage medium (e.g., memory 506 in FIG. 14) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the method is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method to predict heterogeneous shale properties and distribution from seismic data, comprising:
   a. obtaining, at a computer processor, a seismic dataset representative of a subsurface volume of interest;
   b. obtaining, at the computer processor, a model conditioned by petrophysical classifications;
   c. applying the model conditioned by petrophysical classifications to the seismic dataset to identify seismic facies and generate a classified seismic image; and
   d. identifying geologic features based on the classified seismic image.

2. The computer-implemented method of claim 1 wherein the applying the model conditioned by petrophysical classifications comprises:
   a. obtaining regional petrophysical trends;
   b. obtaining local petrophysical data;
   c. comparing the local petrophysical data to the regional petrophysical trends to identify local deviations;
   d. generating local petrophysical classifications using the local deviations to classify shale facies; and
   e. extracting a seismic volume around the local petrophysical data and generating seismic facies probability volumes using supervised machine learning.

3. The method of claim 1 further comprising generating probability cubes for lithologies in the classified seismic image, wherein the lithologies include at least two of sand, soft shale, and hard shale.

4. The method of claim 2 wherein the supervised machine learning is using random forest to classify the seismic facies probability volumes.

5. The method of claim 3 wherein the probability cubes are co-rendered with the seismic volume to visualize the seismic facies with structural elements in the seismic volume.

6. A computer system, comprising:
   one or more processors;
   memory; and
   one or more programs, wherein the one or more programs are stored in the memory and configured to be executed by the one or more processors, the one or more programs including instructions that when executed by the one or more processors cause the device to:
   a. receive, at the one or more processors, a seismic dataset representative of a subsurface volume of interest;
   b. receive, at the one or more processors, a model conditioned by petrophysical classifications;
   c. apply the model conditioned by petrophysical classifications to the seismic dataset to identify seismic facies and generate a classified seismic image; and
   d. identify geologic features based on the classified seismic image.

7. The system of claim 6 wherein applying the model conditioned by petrophysical classifications comprises:
   a. obtaining regional petrophysical trends;
   b. obtaining local petrophysical data;
   c. comparing the local petrophysical data to the regional petrophysical trends to identify local deviations;
   d. generating local petrophysical classifications using the local deviations to classify shale facies; and
   e. extracting a seismic volume around the local petrophysical data and generating seismic facies probability volumes using supervised machine learning.

8. The system of claim 6 further comprising generating probability cubes for lithologies in the classified seismic image, wherein the lithologies include at least two of sand, soft shale, and hard shale.

9. The system of claim 7 wherein the supervised machine learning is using random forest to classify the seismic facies probability volumes.

10. The system of claim 8 wherein the probability cubes are co-rendered with the seismic volume to visualize the seismic facies with structural elements in the seismic volume.

11. A non-transitory computer readable storage medium storing one or more programs, the one or more programs comprising instructions, which when executed by an electronic device with one or more processors and memory, cause the device to:
 a. receive, at one or more processors, a seismic dataset representative of a subsurface volume of interest;
 b. receive, at the one or more processors, a model conditioned by petrophysical classifications;
 c. apply the model conditioned by petrophysical classifications to the seismic dataset to identify seismicfacies and generate a classified seismic image; and
 d. identify geologic features based on the classified seismic image.

12. The non-transitory computer readable storage medium of claim 11 wherein applying the model conditioned by petrophysical classifications comprises:
 a. obtaining regional petrophysical trends;
 b. obtaining local petrophysical data;
 c. comparing the local petrophysical data to the regional petrophysical trends to identify local deviations;
 d. generating local petrophysical classifications using the local deviations to classify shale facies; and
 e. extracting a seismic volume around the local petrophysical data and generating seismic facies probability volumes using supervised machine learning.

13. The non-transitory computer readable storage medium of claim 11 wherein the instructions further cause the device to generate probability cubes for lithologies in the classified seismic image, wherein the lithologies include at least two of sand, soft shale, and hard shale.

14. The non-transitory computer readable storage medium of claim 12 wherein the supervised machine learning is using random forest to classify the seismic facies probability volumes.

15. The non-transitory computer readable storage medium of claim 13 wherein the instructions further cause the device to co-render the probability cubes with the seismic volume to visualize the seismic facies with structural elements in the seismic volume.

* * * * *